US010713853B2

(12) United States Patent
Cullum et al.

(10) Patent No.: US 10,713,853 B2
(45) Date of Patent: Jul. 14, 2020

(54) AUTOMATICALLY GROUPING OBJECTS IN THREE-DIMENSIONAL GRAPHICAL SPACE

(71) Applicant: MICROSOFT TECHNOLOGY LICENSING, LLC, Redmond, WA (US)

(72) Inventors: Alexander Charles Cullum, Maidenhead (GB); Barry John Ptak, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 138 days.

(21) Appl. No.: 15/611,216

(22) Filed: Jun. 1, 2017

(65) Prior Publication Data
US 2018/0114371 A1   Apr. 26, 2018

Related U.S. Application Data

(60) Provisional application No. 62/412,624, filed on Oct. 25, 2016.

(51) Int. Cl.
*G06F 3/0481* (2013.01)
*G06F 3/0484* (2013.01)
*G06T 19/20* (2011.01)

(52) U.S. Cl.
CPC .......... *G06T 19/20* (2013.01); *G06F 3/04815* (2013.01); *G06F 3/04842* (2013.01); *G06F 3/04845* (2013.01); *G06T 2210/12* (2013.01); *G06T 2219/2004* (2013.01); *G06T 2219/2016* (2013.01)

(58) Field of Classification Search
CPC ............... G06F 3/0481; G06F 3/04842; G06F 3/04845; G06F 3/04815; G06T 19/20; G06T 2210/12; G06T 2219/2004; G06T 2219/2016
See application file for complete search history.

(56) References Cited

U.S. PATENT DOCUMENTS

| 5,710,875 | A | 1/1998 | Harashima et al. | |
|---|---|---|---|---|
| 6,476,802 | B1* | 11/2002 | Rose | G06T 13/00 345/419 |
| 6,968,511 | B1* | 11/2005 | Robertson | G06F 3/048 715/205 |
| 7,170,510 | B2 | 1/2007 | Kawahara et al. | |
| 8,477,139 | B2 | 7/2013 | Robinet et al. | |
| 8,799,777 | B1* | 8/2014 | Lee | G06F 3/048 715/702 |
| 2005/0243085 | A1 | 11/2005 | Schechter et al. | |
| 2012/0223909 | A1 | 9/2012 | Tse et al. | |

(Continued)

OTHER PUBLICATIONS

"Parenting and Grouping Objects", Maya Learning Channel, Feb. 7, 2011, available at https://www.youtube.com/watch?v=OFMIHOPjyWA.*

(Continued)

*Primary Examiner* — Matthew Ell
(74) *Attorney, Agent, or Firm* — Shook, Hardy & Bacon, LLP

(57) ABSTRACT

Aspects of the technology described herein provide a control interface for manipulating a 3-D graphical object within a virtual drawing space. The control can automatically group objects together for common manipulation. Example manipulations include position and orientation adjustments.

20 Claims, 7 Drawing Sheets

(56) References Cited

U.S. PATENT DOCUMENTS

| | | |
|---|---|---|
| 2012/0229450 A1 | 9/2012 | Kim et al. |
| 2012/0268410 A1 | 10/2012 | King et al. |
| 2013/0239227 A1 | 9/2013 | Evans et al. |
| 2014/0009402 A1 | 1/2014 | Ma et al. |
| 2014/0198101 A1 | 7/2014 | Vilkin et al. |
| 2016/0189433 A1* | 6/2016 | Dayde .................... G06T 19/20 345/419 |

OTHER PUBLICATIONS

Bukowski, et al., "Object Associations a Simple and Practical Approach to Virtual 3D Manipulation", In Proceedings of the 1995 symposium on Interactive 3D graphics, Apr. 15, 1995, pp. 131-139.

Deering, Michael F, "HoloSketch: A Virtual Reality Sketching/ Animation Tool", In Proceedings of ACM Transactions on Computer-Human Interaction, vol. 2, No. 3, Sep. 1995, pp. 220-238.

Ta, et al., "3D Object detection and viewpoint selection in sketch images using local patch-based Zernike moments", Proceedings of Seventh International Workshop on Content-Based Multimedia Indexing, Jun. 3-5, 2009, 6 pages.

"Autodesk Knowledge Network", https://knowledge.autodesk.com/support/autocad/learn-explore/caas/CloudHelp/cloudhelp/2016/ENU/AutoCAD-Core/files/GUID-2AED1AD1-95C7-4445-9975-4632D8091353C-htm.html, Retrieved on: Dec. 16, 2015, 6 pages.

Schubert, et al., "3D Virtuality Sketching: Interactive 3D-sketching based on real models in a virtual scene", In Proceedings of the 32nd Annual Conference of the Association for Computer Aided Design in Architecture, vol. 32, Oct. 2012, 13 pages.

"Combining Multiple Objects", https://wiki.openoffice.org/wiki/Documentation/OOo3_User Guides/Draw_Guide/Combining_Multiple_Objects, Published on: Feb. 18, 2011, 9 pages.

Wu, et al., "TouchSketch: a touch-based interface for 3D object manipulation and editing", In Proceedings of 21st ACM Symposium on Virtual Reality Software and Technology, Nov. 2, 2015, 11 pages.

* cited by examiner

AUTOMATICALLY GROUPING OBJECTS IN THREE-DIMENSIONAL GRAPHICAL SPACE

CROSS-REFERENCE TO RELATED APPLICATIONS

This application claims the benefit of U.S. Provisional Application No. 62/412,624, filed Oct. 25, 2016, entitled "AUTOMATICALLY GROUPING OBJECTS IN THREE-DIMENSIONAL GRAPHICAL," the entirety of which is herein incorporated by reference.

BACKGROUND

When adjusting the position of a three-dimensional object in three-dimensional graphic space, a user may wish to move a group of related objects together.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein can automatically group objects within a three-dimensional drawing space together for the purpose of group manipulation. The grouping is only for the purpose of manipulation and the association between the objects does not need to be persistent. In one aspect, a first object is selected by the user as an initial group member. For example, the user can double-click on an object to initiate the selection. In one aspect, the first click opens a control interface and the second click, received while the control interface is open, initiates the grouping process. Once initiated, the grouping process walks all objects that touch the initial object or satisfy a closeness criterion in a recursive fashion until all objects either touching or meeting the closeness criterion are grouped together. The control may expand from covering the first selected object to all of the selected objects. Individual objects within the group may be individually deselected by the user clicking on the individual object.

A control interface for manipulating a group of graphical objects within a virtual drawing space is provided. The control can be activated by selecting a graphical object or group of objects. When multiple objects are selected, the manipulations can occur as a group. In one aspect, the manipulations occur around the centroid of the 3-D graphical object, or groups of objects. The manipulations can include rotation, size adjustment, and positional adjustment within the virtual drawing space.

In one aspect, the control comprises a visible bounding box that surrounds the selected object or objects. The bounding box comprises bars that can resize the object uniformly or non-uniformly in the X, Y, or Z dimension. The control interface also comprises controls that rotate the object around an x-axis, a y-axis, or a z-axis.

BRIEF DESCRIPTION OF THE DRAWINGS

Aspects of the disclosure are described in detail below with reference to the attached drawing figures, wherein.

DETAILED DESCRIPTION

Figure 1:
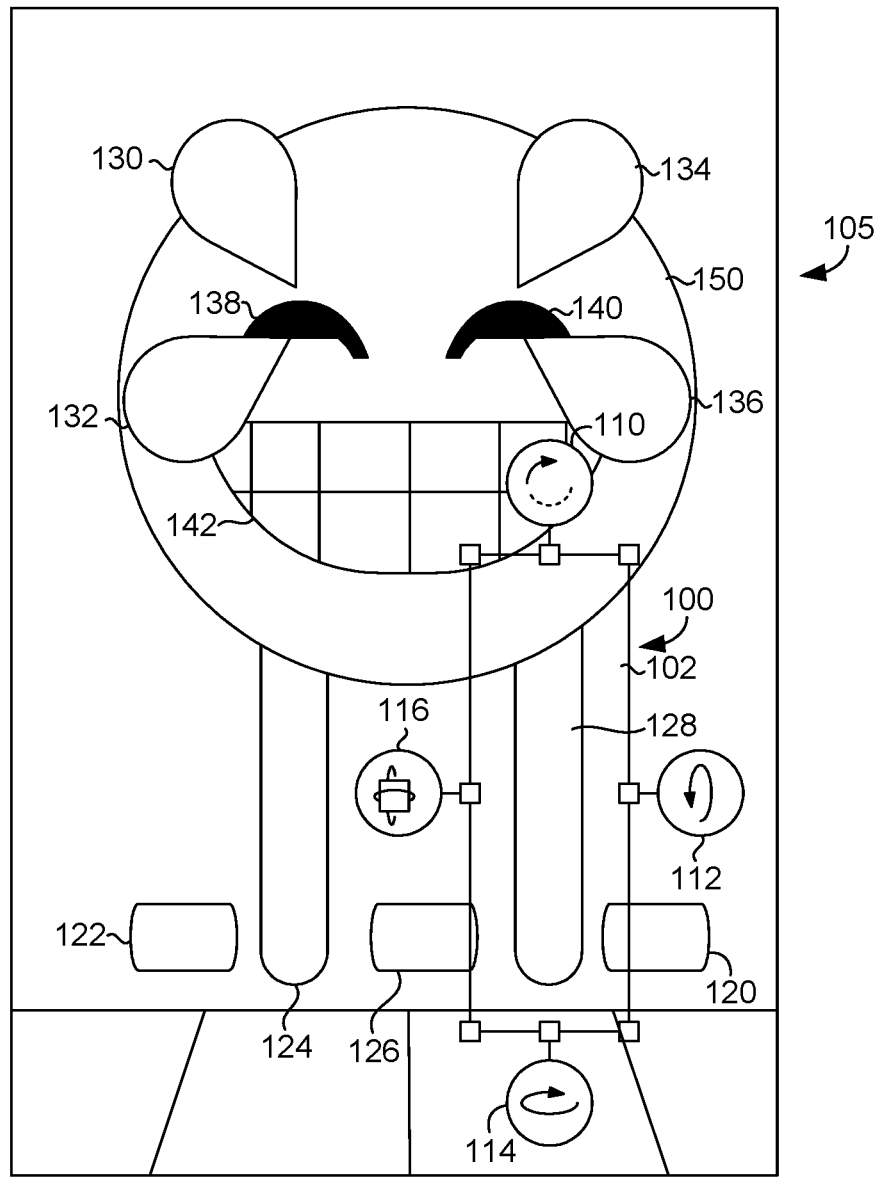
FIG. 1 shows a view of the control interface just after selection of a first object, in accordance with aspects of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein can automatically group objects within a three-dimensional drawing space together for the purpose of group manipulation. The grouping is only for the purpose of manipulation and the association between the objects does not need to be persistent. In one aspect, a first object is selected by the user as an initial group member. For example, the user can double-click on the object to initiate the selection. In one aspect, the first click opens a control interface and the second click, received while the control interface is open, initiates the grouping process. Once initiated, the grouping process walks all objects that touch or satisfy a closeness criterion in a recursive fashion until all objects meeting the closeness criterion are grouped together. The control may expand from covering the first selected object to all of the selected objects. Individual objects within the group may be individually deselected by the user clicking on the object.

A control interface for manipulating a group of graphical objects within a virtual drawing space can be provided. The control can be activated by selecting a graphical object or objects. When multiple objects are selected, the manipulations can occur as a group. In one aspect, the manipulations occur around the centroid of the 3-D graphical object, or groups of objects. The manipulations can include rotation, size adjustment, and positional adjustment within the virtual drawing space.

Selecting the z-translation control can cause the camera view of the drawing space to change to give the user better perspective on the z-location of the objects. The new view can be from above, below, or to a side. In one aspect, the object can be moved forward towards the view or backwards away from the view using a control to the side of the screen. In one aspect, a translucent mesh is displayed in the x-y coordinate plane that intersects the animated character upon activation of the z-translation control. The plane can intersect the centroid of the animated character. The plane can move as the animated character moves to help the user compare the depth of the animated character to the depth of other objects in the virtual drawing space.

In one aspect, the control comprises a visible bounding box that surrounds the selected object or objects. The bounding box comprises bars that can resize the object uniformly or non-uniformly in the X, Y, or Z dimension. The control interface also comprises controls that rotate the object around an x-axis, a y-axis, or a z-axis. The rotation can be about an object-centric axis, world axis, or some other axis. As used herein, an object-centric axis intersects the centroid of the object, but is otherwise directionally aligned with the corresponding x, y, or z world-centric axes. The object-centric axes are independent of the x, y, and z world axes within the virtual drawing space.

Turning now to FIG. 1, a view of the control interface 100 after selection of a first object is shown around a right leg 128, which is one of a group of three-dimensional objects grouped to form an animated character 105. The animated character 105 is a form of a combination of objects. These objects include a right base 120, a mid-base 126, and the left base 122. The objects also include a left leg 124 and the aforementioned right leg 128. Notice there is some distance between the base pieces and the legs. The legs are connected to or in contact with a spherical yellow body 150. The body 150 is connected to a mouth 142, left eye 138, and right eye 140. Tears 130, 132, 134, and 136 complete the animated FIG. 105.

The control interface 100 includes a bounding box 102 that surrounds the selected object. The control interface 100 also includes a z-axis manipulator control 110, an x-axis manipulator control 112, a y-axis manipulator control 114, and a z-translation control 116. A user can rotate the right leg 128 about the z-axis using the z-axis manipulator control 110. In an aspect, selecting a right side of the z-axis manipulator control 110 will rotate the top of the right leg 128 to the right from the viewer's perspective. In an aspect, selecting the left side of the z-axis manipulator control 110 will rotate the top of the right leg 128 to the left. Alternatively, the z-axis manipulator control 110 can rotate the right leg 128 around the z-axis in only one direction. The z-axis manipulator control 110 can be depicted as an arrow.

The x-axis manipulator control 112 can be used to rotate the right leg 128 about the x-axis. In an aspect, selecting one portion of the x-axis manipulator control 112 will rotate the top of the right leg 128 towards the viewer. In an aspect, selecting the opposite side of the x-axis manipulator control 112 will rotate the top of the right leg 128 away from the viewer. Alternatively, the x-axis manipulator control 112 can rotate the right leg 128 around the x-axis in only one direction.

The y-axis manipulator control 114 can be used to rotate the right leg 128 about the y-axis. In an aspect, selecting one portion of the y-axis manipulator control 114 will rotate the right leg 128 in a first direction. In an aspect, selecting the opposite side of the y-axis manipulator control 114 will rotate the right leg 128 in the opposite direction. Alternatively, the y-axis manipulator control 114 can rotate the object around the y-axis in only one direction.

The z-translation control 116 can change an object's positional depth within the virtual drawing space. The depth of an object corresponds to the z-value of the object's centroid. Increasing the z-value of the centroid can be described as moving the object forward towards the viewer. Decreasing the z-value of the centroid can be described as moving the object backwards away from the viewer.

Figure 2:
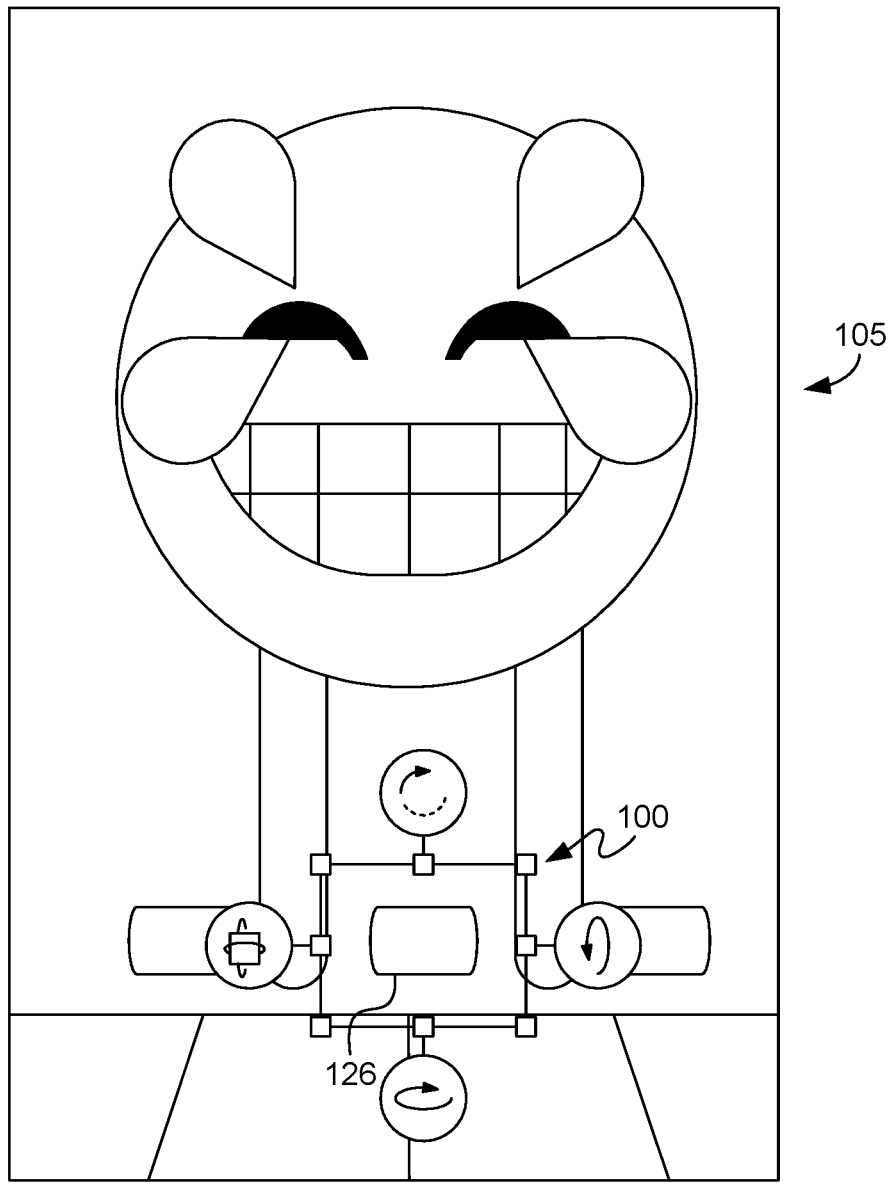
FIG. 2 shows a view of the control interface just after selection of a second object, in accordance with aspects of the present disclosure.

Turning now to FIG. 2, a view is shown of the control interface 100 after selection of a mid-base 126, which is one of a group of three-dimensional objects grouped to form an animated character 105. The control interface 100 includes the same controls as described previously, but would now manipulate only the mid-base 126 if activated.

The user is able to activate a group selection function in any number of ways. In one aspect, a group selection function button, such as a menu icon, is pushed. The next object selected can then be the initial object from which the group is built. In order to identify group members, a recursive process can evaluate objects in the 3-D space according to a set of criteria. The criteria can group objects that touch or are within a threshold distance. The threshold distance can be absolute or relative to an object's size. An absolute threshold could be measured along the closest distance between the exterior of two objects. Any suitable unit of measure within the 3-D space could be used. The relative threshold is based on a size of one or both objects being considered. For example, the threshold distance could be a percentage of an object's width, height, or length. In one aspect, the threshold is a percentage of the average of the width, height, and length of the larger of two objects being evaluated. In another aspect, the size of only the base object is considered.

The recursive process works by evaluating each object near the initial object. Objects are either added or rejected from the group. As an object is added, the process repeats using the newly added object as the base object for making the determination.

In one aspect, the three-dimensional objects in a drawing space may be projected against a plane that is normal to the current camera angle on the scene for the purpose of determining distance between objects. For example, if the camera was looking straight down the z-axis, then the objects could be projected onto the x-y plane for analysis. Projecting the objects onto a plane eliminates one dimension from the analysis. In the example above, the projected objects could be in contact with each other even though they are at different depths along the z-axis and not actually in contact or even close. In an aspect, the projection is combined with a threshold criteria corresponding to a distance between objects along the axis excluded from the projection. For example, the z-axis would be the excluded axis if objects were projected against an x-y plane. In this scenario, distance between objects along the z-axis could be measured and compared with the threshold criteria to determine whether an association should occur. In one aspect, only objects within the threshold criteria are included in the projection. In another aspect, the threshold criteria is used in combination with the analysis of the projected objects as an additional criteria. In other words, to be included in an object group the projection of the object would need to satisfy a criteria and object would need to also satisfy the threshold criteria along the excluded axis.

Figure 3:
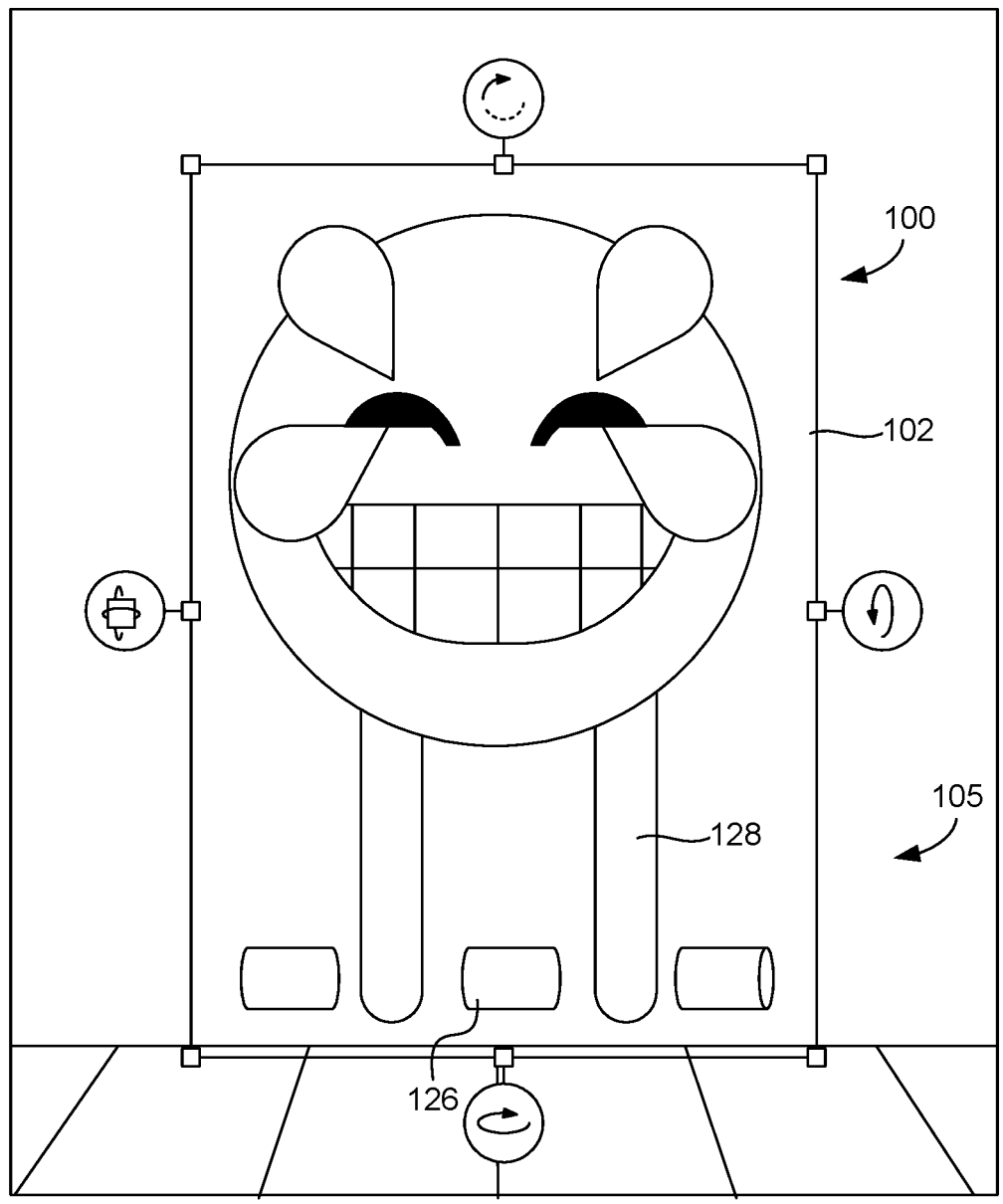
FIG. 3 shows a view of the control interface just after objects were grouped together in response to selecting either the first or the second object, in accordance with aspects of the present disclosure.

Turning now to FIG. 3, the result of a group analysis in response to the selection of the right leg 128, as shown in FIG. 1, or the mid-base 126, as shown in FIG. 2, is shown. A visible indication that the objects form a single group is provided by the control interface 100 surrounding all of the objects. In this case, the visible indication is the bounding box 102 of the control interface 100. Additional or different indications could be given, such as causing selected items to glow, change to a common color, or such.

Figure 4:
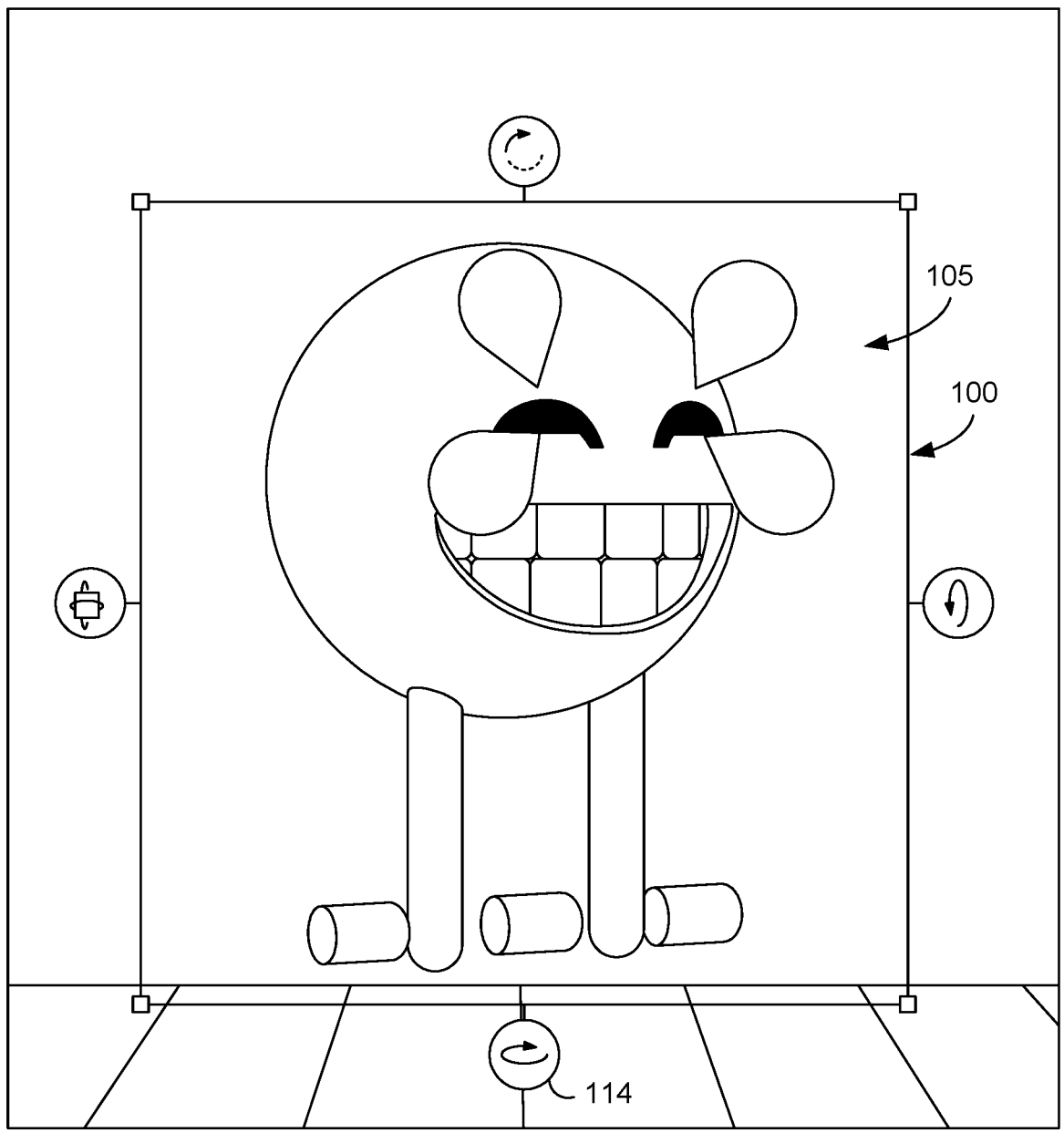
FIG. 4 shows a rotation of the group around the y-axis, in accordance with aspects of the present disclosure.

Turning now to FIG. 4, the joint manipulation of a group of objects using the control interface 100 is shown. Upon selection of the y-axis control 114, the animated character 105 rotates along the y-axis (not shown, but running vertically through a centroid of the group of objects). As shown, all objects in the group rotate about a common axis by the same amount. The individual items do not rotate individually, as would be the case if just a single item were selected; instead they rotate as a single object around a single axis. This means that the objects stay in the same relative position and orientation with respect to each other, though they move position and orientation in world space.

Figure 5:
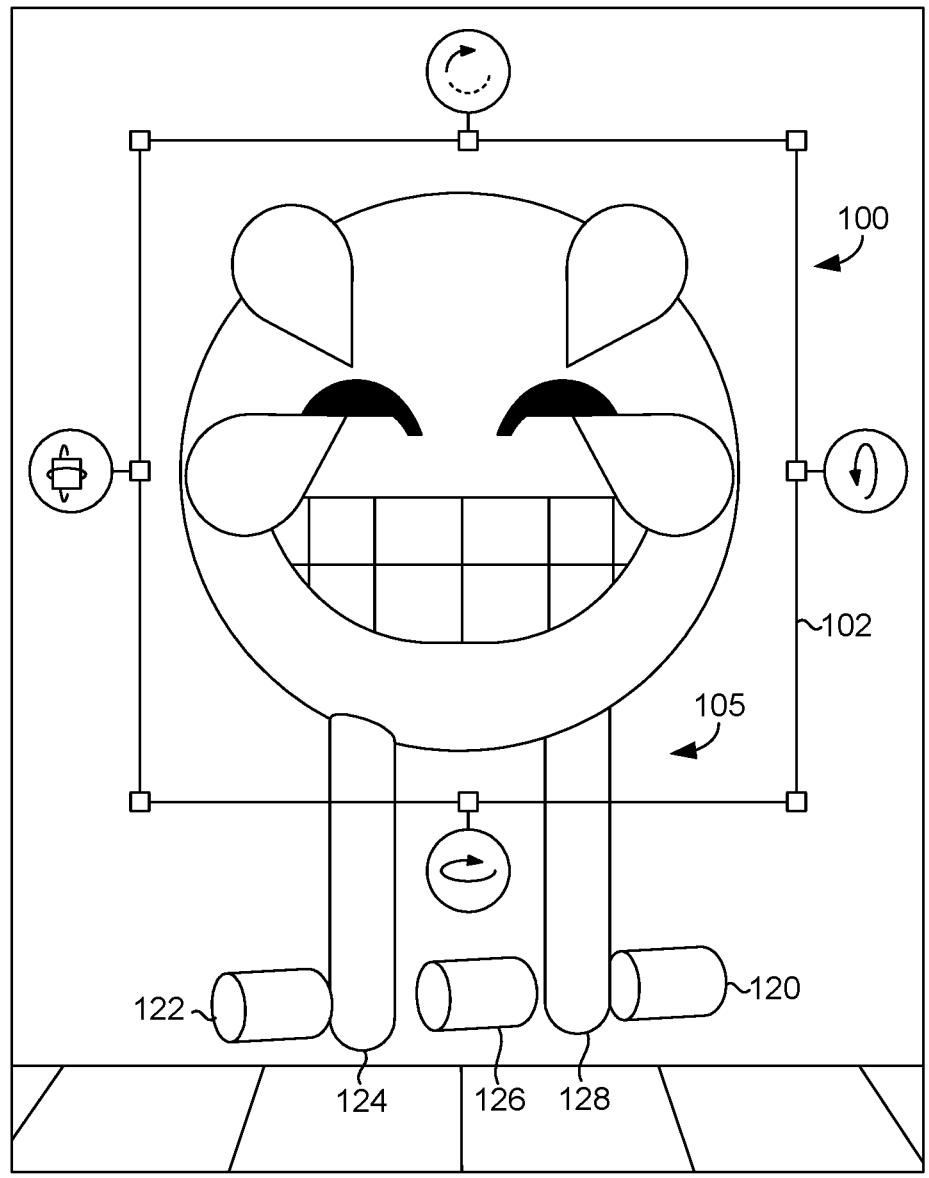
FIG. 5 shows the result of deselecting some of the grouped objects, in accordance with aspects of the present disclosure.

FIG. 5 shows what happens when items are removed from a group by a user. In this instance, the right leg 128, the left leg 124, right base 120, mid-base 126, and left base 122 were all deselected individually. The bounding box 102 in control interface 100 changes size to indicate the objects that remain selected.

Figure 6:
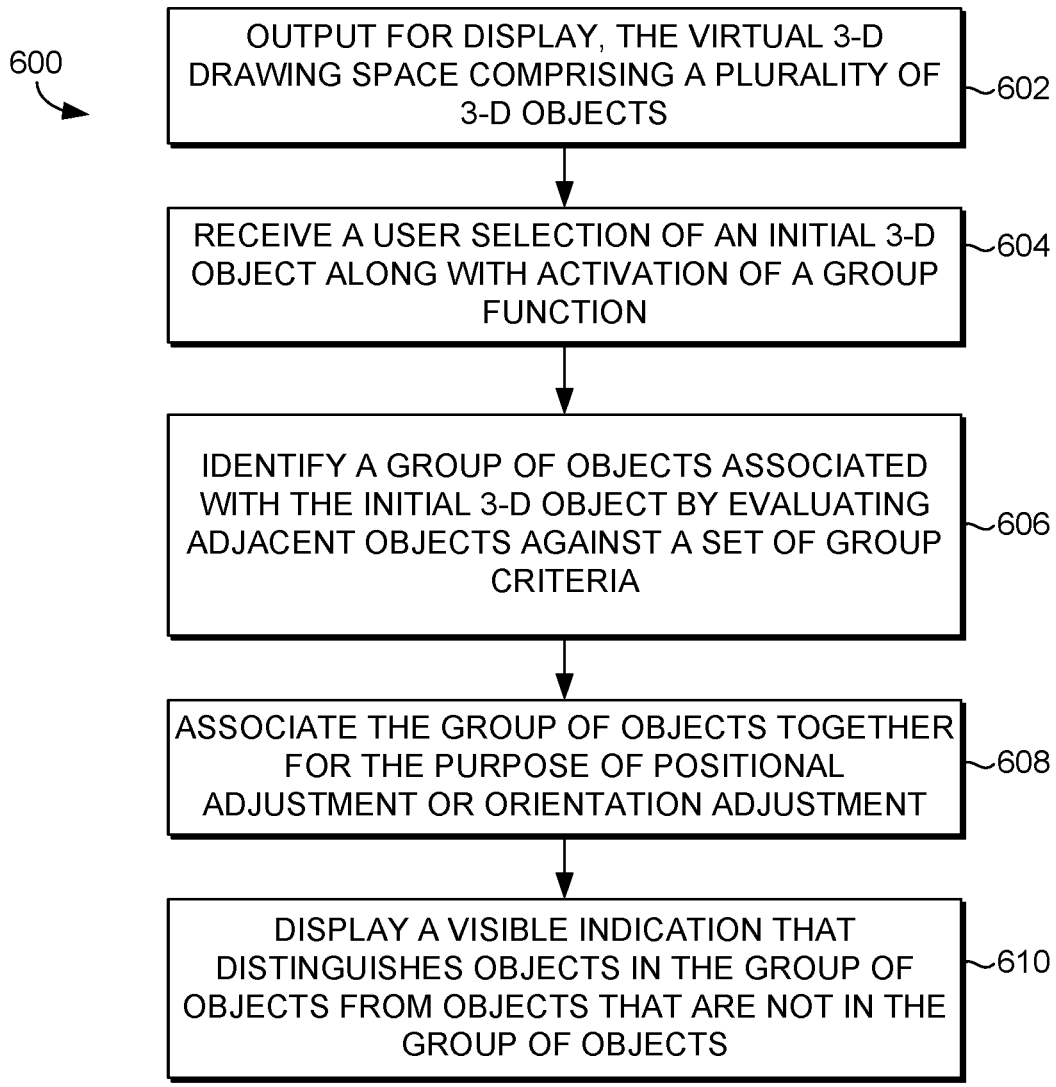
FIG. 6 shows a flow diagram for a method of grouping objects, in accordance with aspects of the present disclosure.

Turning now to FIG. 6, a flow diagram of a method 600 for manipulation of a 3-D graphical object is shown, in accordance with aspects of the present disclosure. Method 600 could be performed by a computing device, such as computing device 700. The computing device can take the form of a laptop computer, a personal computer with detached display, a tablet computer, a smartphone, a holographic display, a virtual reality headset, an augmented reality headset, or some combination of the above or similar devices.

At step 602, the virtual 3-D drawing space comprising a plurality of the 3-D objects is output for display. The virtual 3-D drawing space can be displayed in 3-D, using stereoscopic technology, or other techniques that provide a three-dimensional appearance to the display. The virtual 3-D drawing space can also be displayed in 2-D with various camera angles used to depict the 3-D space.

At step 604, a user selection of the 3-D object is received along with activation of a group function. The user selection can occur when the user contacts the 3-D object with a cursor. The cursor can be controlled by a mouse, touchscreen input (e.g., stylus, finger), trackball, gaze detection, head movement, voice control, gestures, or other input techniques. In one aspect, the user selection occurs when the cursor contacts the 3-D object and a second input, such as a mouse click, is provided. As an alternative to a cursor, objects could be selected via voice control, keyboard, or other mechanism In one aspect, double-clicking an object both selects the object and activates the group function.

At step 606, a group of objects associated with the initial 3-D object is identified by evaluating adjacent objects against a set of group criteria. In order to identify group members, a recursive process can evaluate objects in the 3-D space according to a set of criteria. The criteria can group objects that touch or are within a threshold distance. The threshold distance can be absolute or relative to an object's size. An absolute threshold could be measured along the closest distance between the exterior of two objects. Any suitable unit of measure within the 3-D space could be used. The relative threshold is based on one or both objects being considered. For example, the threshold distance could be a percentage of an object's width, height, or length. In one aspect, the threshold is a percentage of the average distance of the width, height, and length.

The recursive process works by evaluating each object near the initial object. Objects are either added or rejected from the group. As an object is added, the process repeats using the newly added object as the base object for making the determination.

In one aspect, the three-dimensional objects in a drawing space are projected against a plane that is normal to the current camera angle on the scene. For example, if the camera was looking straight down the z-axis, then the objects could be projected onto the x-y plane for analysis. Projecting the objects onto a plane eliminates one dimension from the analysis. In the example above, the projected objects could be in contact with each other even though they are at different depths along the z-axis and not actually in contact or even close.

At step 608, the method continues by associating the group of objects together for the purpose of positional adjustment or orientation adjustment. This may be accomplished by logging object IDs with each other in a data store. The object IDs can then be provided to a manipulation tool, which then jointly manipulates the group of objects.

At step 610, a visible indication that distinguishes objects in the group of objects from objects that are not in the group of objects is displayed. In one aspect, a control around the group of 3-D objects is displayed in response as a visible indication. In one aspect, the control is a two-dimensional control. The control comprises an x-axis rotation control, a y-axis rotation control, and a z-axis rotation control. The control can also include a bounding box that enables uniform and/or non-uniform scaling of the object. In one aspect, the x-axis rotation control is located outside of the bounding box on, or adjacent to, the x-axis. In one aspect, the y-axis rotation control is located outside of the bounding box on, or adjacent to, the y-axis. In one aspect, the z-axis rotation control is located outside of the bounding box on, or adjacent to, the z-axis on the side opposite the x or y-axis rotation control. The z-translation control can be located on a side of the box without one of the other controls.

In another aspect, the visible indication is a change in appearance for each object selected. For example, each selected object could glow or change into a common color, such as green. The visible indication could be generated by changing an appearance of non-selected items, while leaving the selected items unchanged. For example, the translucency of the non-selected items could be increased to make them appear dimmer than selected objects.

The group selections described above can work with various methods of individual selection. For example, given the user is in the object selection mode, and the user drags a box in the work area, any objects inside that area will become selected together (regardless of their depth in the scene). Given the user is in the object selection mode, and the user shift-clicks an object, that object will be added to the current selection. If zero objects are selected, shift-clicking will select the first object as normal.

Given the user is in the object selection mode with one or more objects selected, and the user drags a box in the work area, any objects inside that box area will have their selection state reversed. In other words, if an object in the group is moved individually, then it is dissociated with the group until the user associates it again.

When group selection is active, selected objects will be deselected and unselected objects will be added to the group. Given there are a number of objects selected, the control interface 100 will surround all the selected objects and all selected objects may also have a visible glow around them.

Given there are a number of objects selected with a surrounding control interface 100 and glow, any unselected objects in the same volume will not have the colored glow around them.

Given there are a number of objects selected, and the user clicks the Group button, the objects can be associated together. Given the user is in the object selection mode and the user clicks on an object in a group, all other objects in the group can also be selected. Given the user is in the object selection mode and the user has an object or objects selected, if the user shift-clicks a group of objects, that group will be added to the current selection. Given the user is using the mouse or pen and is in object selection mode, and the user hovers over any object, the user will see a light glow to indicate they could select that object. The light glow acts as a hint. For groups, all objects in the group may glow. If the objects are physically overlapping only an 'outline' glow around their outer limit will be shown, in one aspect.

In some instances, a group of objects can comprise several subgroups. For example, auto grouping could identify several groups of objects and then the user could associate the groups with each other. There can be a hierarchy among groups based on size, group orientation, or other factors. Given the user has an active selection of more than one object, and the user double-clicks/taps on an object in the selection, the object (or group) tapped will temporarily become selected instead ("isolation mode"). Further double taps will drill down through any group hierarchy until a single object is selected.

The control interface 100 and object glow(s) will behave dynamically as the user drills down with double taps to indicate which group of items or individual item is selected. These behaviors will allow users to tweak/rotate/align objects in complex groups without ungrouping.

Figure 7:
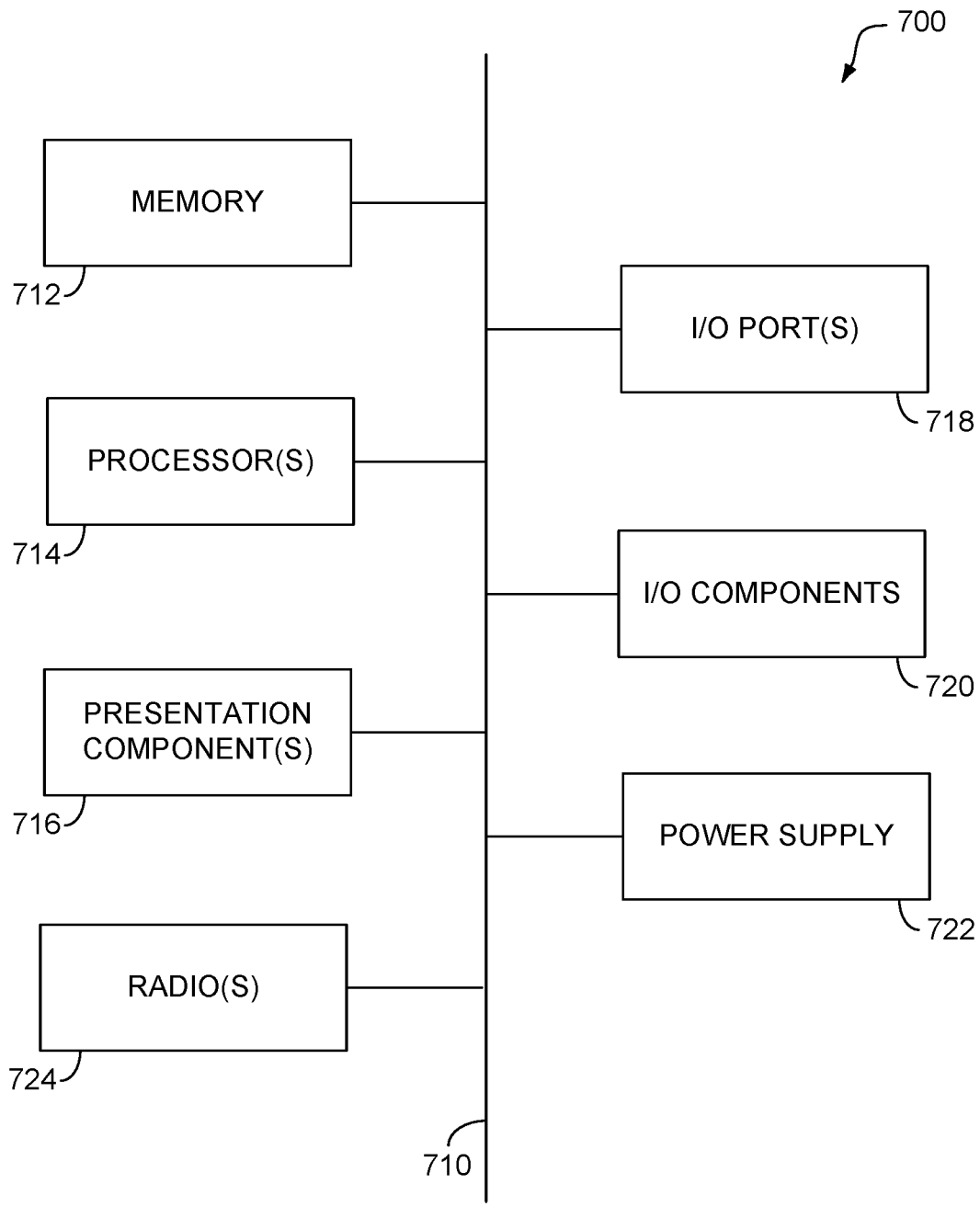
FIG. 7 is a block diagram of an exemplary computing environment suitable for use in implementing an aspect of the present disclosure.

Having described various implementations, an exemplary computing environment suitable for implementing aspects of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of aspects of the disclosure. Neither should the computing device 700 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some aspects of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of grouping three-dimensional (3-D) graphical objects displayed in a virtual 3-D drawing space generated by a computer, the method comprising:
   outputting for display, the virtual 3-D drawing space comprising a plurality of 3-D graphical objects;
   receiving a user selection of a group command;
   subsequent to receiving the user selection of the group command, receiving a user selection of an initial 3-D object to build a group around;
   calculating a threshold distance based on a dimension of the initial 3-D object, wherein the threshold distance increases as the dimension of the initial 3-D object increases;
   identifying a group of objects associated with the initial 3-D object that are within the threshold distance to the initial object;
   automatically associating the group of objects together for a purpose of making an adjustment to the group of objects; and
   displaying a visible indication that distinguishes objects in the group of objects from objects that are not in the group of objects.

2. The method of claim 1, wherein the visible indication is a change in color of each object in the group of objects.

3. The method of claim 1, wherein the visible indication is each object in the group of objects glowing.

4. The method of claim 1, wherein the visible indication is a control interface enclosing each object in the group of objects.

5. The method of claim 1, wherein the adjustment is a positional adjustment.

6. The method of claim 1, wherein the adjustment is an orientation adjustment.

7. The method of claim 1, wherein the threshold distance is an average of the initial 3-D object's height, width, and length.

8. A method of grouping three-dimensional (3-D) graphical objects displayed in a virtual 3-D drawing space generated by a computer, the method comprising:
   outputting for display, the virtual 3-D drawing space comprising a plurality of 3-D graphical objects;
   receiving a user selection of an initial 3-D object at a point in time
   calculating a threshold distance based on a dimension of the initial 3-D object, such that the threshold distance will increase as the dimension of the initial 3-D object increases;
   determining that an additional object is within the threshold distance of the initial object at the point in time;
   automatically associating the additional object and the initial object together to form an object group for a purpose of making an adjustment to the object group because the additional object satisfies the group criteria;
   receiving an adjustment instruction through a user interface; and
   adjusting the initial object and the additional object together.

9. The method of claim 8, further comprising identifying a second object that is within a threshold distance of the additional object; and
   associating the second object with the object group.

10. The method of claim 9, wherein the threshold distance is a percentage of a dimension of the additional object.

11. The method of claim 8, wherein the adjustment is a positional adjustment.

12. The method of claim 8, wherein the adjustment is an orientation adjustment.

13. The method of claim 12, wherein the orientation adjustment is around an axis that passes through a centroid of the object group.

14. The method of claim 8, wherein the method further comprises changing a color of each object in the object group to indicate the objects are in the object group.

15. One or more computer storage media having computer executable instructions embodied thereon that when executed by a computing device performs a method of grouping three-dimensional (3-D) graphical objects displayed in a virtual 3-D drawing space generated by a computer, the method comprising:
   outputting for display, the virtual 3-D drawing space comprising a plurality of 3-D graphical objects that are not in contact;
   receiving a user selection of an initial 3-D object;
   identifying a first object that satisfies a group criteria with the initial 3-D object, wherein the group criteria is a threshold distance based on a dimension of the initial 3-D object, such that the threshold distance will increase as the dimension of the initial 3-D object increases;
   identifying a second object that satisfies the group criteria with the first object;
   associating the initial 3-D object, the first object, and the second object together as a group of objects for a purpose of making an adjustment to the group of objects; and
   displaying a visible indication that distinguishes objects in the group of objects from objects that are not in the group of objects.

16. The media of claim 15, wherein the visible indication is each object in the group of objects glowing.

17. The media of claim 15, wherein the visible indication is a control interface enclosing each object in the group of objects.

18. The media of claim 15, wherein the adjustment is a positional adjustment.

19. The media of claim 15, wherein the group criteria is a threshold distance.

20. The media of claim 15, wherein the threshold distance is a percentage of a dimension of the initial 3-D object.

\* \* \* \* \*